Nov. 8, 1932.   G. R. METCALF, JR   1,886,413
CONDUIT FITTING
Filed April 4, 1928
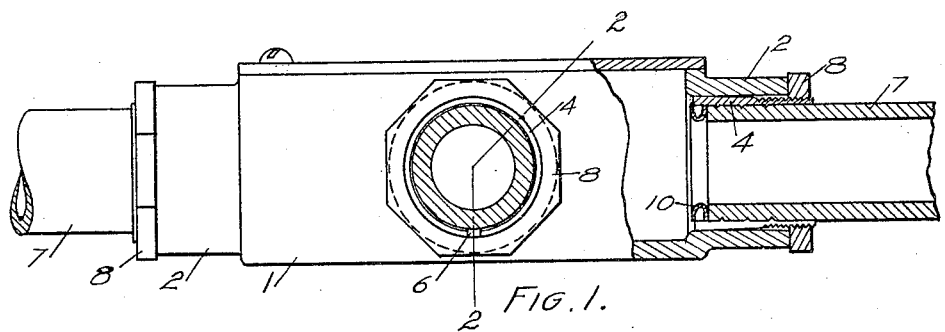
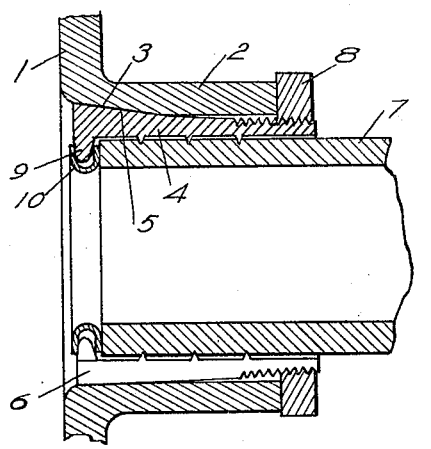
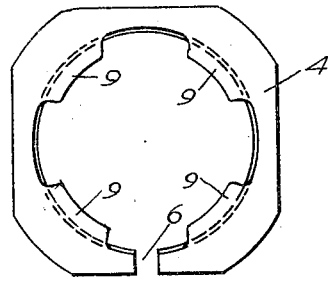
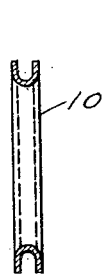
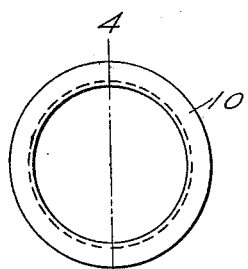
George R. Metcalf Jr.
INVENTOR.
BY
ATTORNEYS.

Patented Nov. 8, 1932

1,886,413

UNITED STATES PATENT OFFICE

GEORGE R. METCALF, JR., OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed April 4, 1928. Serial No. 267,436.

This invention is designed to improve guard shoulders on conduit fittings, particularly conduit fittings using a slotted sleeve leading to the guard shoulder. Features and details of the invention will appear from the specification and claims.

A preferred embodiment of the invention is illustrated in the accompanying drawing as follows:—

Fig. 1 shows a side elevation of a conduit box, partly in section:—

Fig. 2 an enlarged view of one of the outlets of the box on the line 2—2 in Fig. 1:—

Fig. 3 an end view of a slotted sleeve used in the fitting:—

Fig. 4 a section of a guard ring on the line 4—4 in Fig. 5:—

Fig. 5 a side elevation of the same.

1 marks the conduit body and 2 extensions on the body having conduit-receiving openings therein. The extensions have the wedge or tapered surfaces 3.

A sleeve 4 is arranged within the opening, the sleeve having the tapered or wedged surfaces 5 engaging the surfaces 3. The sleeve is slotted at 6 rendering it contractible and as it is drawn endwise into the opening the wedge surfaces contract it into clamping engagement with an inserted conduit 7.

The outer end of the sleeve is exteriorly screw threaded and a nut 8 is arranged on these threads for forcing the endwise movement of the sleeve. In general this structure is similar to that disclosed in the patent to Selah, #1,597,486, Aug. 24, 1926.

Arranged at the inner ends of the sleeve are a series of shoulders 9 corresponding in position to the guard shoulder on the ordinary conduit. Where the slot extends through the sleeve and the guard shoulder is separated at the slot the edges of the slot form surfaces which injure the insulation of conductors as they are drawn into the box. To obviate this difficulty sleeves have been formed with a continuous guard and a part of the guard is separated from the body of the sleeve by a circumferential slot extending from the longitudinal slot. The forming of this circumferential slot is a rather difficult one involving comparatively considerable expense.

With the present invention the slot 6 extends entirely through the sleeve and a continuous ring 10 of sheet metal is formed approximately of U-shape in cross section, thus forming a groove into which the shoulders 9 extend. This forms a continuous leading guard surface. The sheet metal may be formed in place over the shoulders and the sleeve sprung sufficiently to permit its entrance. Ordinarily, however, the material used for the sleeve would not permit of such distortion. The sides of the groove are preferably of such width as to engage the sides of the shoulders 9 so that the guard shoulder is securely held in place and the depth of the groove is somewhat greater than the depth of the shoulders so that as the shoulders are contracted with the sleeve they are forced inwardly to a greater depth in the groove. Preferably also the sides of the shoulders are slightly inclined, or wedge-shaped so that the guard ring is centered with different degrees of contraction of the sleeve.

What I claim as new is:—

1. In a conduit fitting, the combination of a body having a conduit-receiving opening therein; a contractible sleeve in the opening having a slot terminating at its inner end, said sleeve and body having engaging wedging surfaces acting to contract the sleeve upon relative axial movement of the wedging surfaces, and said contractible sleeve being adapted to lock by its contraction the body with an inserted conduit; and a guard ring forming a continuous lead surface attached to the sleeve at its inner end having means providing for radial movement of the sleeve relatively to the guard as the sleeve is contracted, said means permitting the relative axial movement of the sleeve and body to effect the contraction of the sleeve through the wedging action of the wedging surfaces.

2. In a conduit fitting, the combination of a body having a conduit-receiving opening therein; a contractible sleeve in the opening having a slot terminating at its inner end and a shoulder at its inner end, said contractible sleeve being adapted to lock by its contraction the body with an inserted conduit; means contracting the sleeve; and a guard ring forming a continuous lead surface having a groove on its outer periphery, the walls of which engage the walls of the shoulder.

3. In a conduit fitting, the combination of a body having a conduit-receiving opening therein; a contractible sleeve in the opening having a slot terminating at its inner end and a shoulder at its inner end, said contractible sleeve being adapted to lock by its contraction the body with an inserted conduit; means contracting the sleeve; and a guard ring forming a continuous lead surface having a groove on its outer periphery, the walls of which engage the walls of the shoulder, said groove having a depth permitting the contracting of the sleeve by relative radial movement between the guard ring and the shoulder.

4. In a conduit fitting, the combination of a body having a conduit-receiving opening therein; a contractible sleeve in the opening having a slot terminating at its inner end; said contractible sleeve being adapted to lock by its contraction the body with an inserted conduit; means contracting the sleeve; a guard ring forming a continuous lead surface; and a shoulder and groove connection between the ring and sleeve, said connection giving relative radial freedom between the sleeve and ring to permit the contraction of the sleeve.

5. The combination of a contractible sleeve having a slot terminating at its end, said sleeve being adapted on its outer surface to engage a conduit fitting and on its inner surface to engage and clamp an inserted conduit; a guard ring forming a continuous surface; and a shoulder and groove connection between the sleeve and ring, said shoulder and groove connection having radial relative freedom to permit the contraction of the sleeve.

6. In a conduit fitting, the combination of a body having a conduit-receiving opening therein; a contractible sleeve in the opening having a slot terminating at its inner end and a shoulder at its inner end, said contractible sleeve being adapted to lock by its contraction the body with an inserted conduit; means contracting the sleeve; and a guard ring forming a continuous lead surface having a groove on its outer periphery, the walls of which are relatively inclined to and have centering engagement with the walls of the shoulder.

7. In a conduit fitting, the combination of a body having a conduit-receiving opening therein; a contractible sleeve in the opening having a slot terminating at its inner end, said contractible sleeve being adapted to lock by its contraction the body with an inserted conduit; means contracting the sleeve; a guard ring forming a continuous lead surface; and a shoulder and groove connection between the ring and sleeve, the wall surfaces of the shoulder and groove being relatively inclined and in centering engagement, said connection giving relative radial freedom between the sleeve and ring to permit the contraction of the sleeve.

8. The combination of a contractible sleeve having a slot terminating at its end, said sleeve being adapted on its outer surface to engage a conduit fitting and on its inner surface to engage and clamp an inserted conduit; a guard ring forming a continuous surface; and a shoulder and groove connection between the sleeve and ring, the wall surfaces of the shoulder and groove being relatively inclined and in centering engagement, said shoulder and groove connection having radial relative freedom to permit the contraction of the sleeve.

In testimony whereof I have hereunto set my hand.

GEORGE R. METCALF, Jr.